United States Patent Office 3,262,846
Patented July 26, 1966

3,262,846
STABLE COPPER EMULSION FOR CONTROLLING PLANT DISEASES
Charles D. Ercegovich, Hartsdale, N.Y., assignor, by mesne assignments, to Tennessee Corporation, New York, N.Y., a corporation of Delaware
No Drawing. Filed Nov. 6, 1962, Ser. No. 244,231
(Filed under Rule 47(b) and 35 U.S.C. 118)
3 Claims. (Cl. 167—42)

This invention relates to the use of fungicidal chemicals to control plant diseases and particularly to highly stable copper emulsions adapted for spraying plants infested or infected with fungi.

The fungicidal properties of copper and copper salts are well known. However, the use of such products in spray form has been seriously hindered heretofore because of difficulties in keeping them in sprayable suspensions with the result that poor coverage and adherence and consequently inferior plant disease control have usually been obtained. In efforts to overcome these disadvantages, emulsions have been prepared with copper compounds dissolved or suspended in an oil phase, and it has even been proposed to incorporate copper in both the oil and water phases of the same emulsion in order to make more copper available as the toxiphore. However, such efforts have accomplished nothing in improving the suspension, spraying, coverage and adherence properties which are vital for fungicidal control with any pesticide formulation.

Another difficulty encountered with such sprayable materials is that large quantities of water (100 gallons or more per acre) and some means of constant agitation must be used. It is quite obvious that such a procedure is cumbersome and expensive.

At least in part because of the foregoing difficulties, the use of copper for fungicidal purposes has been principally in dust form, either alone or with sulfur. Although disease control may be afforded by such dusts, they are difficult to apply, skin and eye irritation often occurs, and users must invest in extra dusting equipment that would not be required were a satisfactory sprayable fungicidal available. Because of such factors, the present need and trend in fungicidal control is to employ effective sprayable formulations.

The present invention involves the discovery that copper formulations such as described hereinafter will form stable emulsions when added to water and that certain plant diseases can be controlled most effectively by spray treatment using such emulsions. The superior results obtained are the direct result of effectively suspending a small quantity of copper in a stable emulsion. Such a suspension results in all of the copper being well distributed in the spray mixture and this in turn accounts for excellent disease control as a result of uniform coverage and adherence on the plant.

Fungicidal formulations embodying the invention consist essentially of a water-emulsifiable vehicle in the form of a liquid petroleum distillate, an emulsifier preferably of the non-ionic alkylphenoxypoly(ethyleneoxy)ethanol group, and oil soluble copper salts of fatty and rosin acids which are dissolved in said vehicle, such formulations being referred to hereinafter as copper tallate.

Preferred formulations contain 40–50 percent of a copper salts mixture of fatty and rosin acids, 35–40 percent paraffinic petroleum distillate, and 10–15 percent alkylphenoxypoly(ethyleneoxy)ethanol emulsifier. For example, excellent results have been obtained with a copper salt mixture containing 10–14 percent copper oleate, 8–12 percent copper linoleate and 20–25 percent copper abietate (commonly called copper resinate), and 10–15 percent nonylphenoxypoly(ethylenoxy) ethanol, in which case the formulation contains about 4% copper. When desirable fungicidal properties were considered (plant safety, fungicidal activity and quality of emulsion) this formulation was superior to over 100 other formulations containing copper resinate, copper oleate and copper linoleate or mixtures prepared therefrom.

Petroleum distillates suitable for use in formulations embodying the invention comprise known agricultural spray oils such as paraffinic and naphthenic petroleum oils having SUS viscosities in the range of 70–160 at 100° F. and distillation ranges within 600–900° F. In the formulation set forth above as an example, an agricultural spray oil was used having an SUS viscosity of 70–75 at 100° F. and comprising 68–72% paraffinic constituents, 16–24% naphthenic constituents, and 8–12% aromatic constituents.

As to the emulsifier, good results have been obtained with such diverse materials as calcium salts of amyl esters of sulfonated tall oil, ethanolamines, amines, alkyphenylpolyethylene glycol ether, salts of alkyl aryl sulfonates, nonylphenylpolyethylene glycol ether, iso-propylamine salt of dodecylbenzene sulfonic acid, and morpholine. However, non-ionic emulsifiers of the alkylphenoxy(ethyleneoxy) ethanol group mentioned above give superior results and are preferred. Representative examples of this preferred group are iso-octylphenoxypoly(ethyleneoxy) ethanol, nonylphenoxypoly(ethyleneoxy) ethanol, dodecylphenoxypoly(ethyleneoxy) ethanol, and di-nonylphenoxypoly(ethylenoxy) ethanol.

The following data indicate the stability of water emulsions prepared with copper tallate formulations embodying the invention, as typified by the example particularly set forth above:

TABLE 1.—THE STABILITY OF THE EMULSION FORMED WITH 1–20 PERCENT COPPER TALLATE IN WATER [1]

| Hours after adding to water: | Percent separation of emulsion by volume |
|---|---|
| 24 | 1.0 |
| 48 | 1.5 |
| 72 | 2.0 |
| 72 or longer | 2.0 |

[1] All concentrations between 1–20 percent showed the same amount of separation.

In comparative spray tests in North Carolina, Alabama and Georgia with inorganic and organic fungicides copper tallate was superior to fungicides with which it was compared. Examples of such activity are presented below.

TABLE 2.—COMPARATIVE EFFECTIVENESS OF COPPER TALLATE AND OTHER FUNGICIDES IN CONTROLLING PEANUT LEAF SPOT (CAUSED BY *CERCOSPORA ARACHIDICOLA* HORI AND/OR *C. PERSONATA* BERK. AND CURT.) WITH WEEKLY AND BIWEEKLY FUNGICIDAL SPRAYS AS INDICATED BY DEFOLIATION

| Fungicide | Lbs./ Acre [1] | No. of Leaves Defoliated | |
|---|---|---|---|
| | | 2 Week Intervals | 1 Week Intervals |
| Copper as in Tribasic copper sulfate plus sulfur [2] | 1.00 | 13.2 | |
| Manganese ethylene bisdithiocarbamate | 0.80–1.20 | 17.0 | 12.0 |
| Copper as in copper tallate | 0.48–0.73 | 11.4 | 9.0 |
| N-trichloromethyl thiophthalimide | 1.00–1.50 | 19.2 | 14.3 |
| n-Dodecylguanidine acetate | 0.32–0.48 | 13.6 | 11.0 |
| 2,4-dichloro-6-(O-chloroaniline)triazine | 1.00–1.50 | 17.8 | 12.5 |
| Non-treated | | 20.0 | |

[1] Recommended rates of active ingredients.
[2] Dust mixture containing 10% tribasic copper sulfate (53% copper) and 90% sulfur.

TABLE 3.—COMPARATIVE EFFECTIVENESS OF COPPER TALLATE AND OTHER FUNGICIDES IN CONTROLLING PEANUT LEAF SPOT (CAUSED BY *CERCOSPORA ARACHIDICOLA* HORI AND/OR *C. PERSONATA* BERK. AND CURT.) WITH WEEKLY AND BIWEEKLY FUNGICIDAL SPRAYS AS INDICATED BY DEFOLIATION

| Fungicide | Spray, Gals./Acre | Lbs./Acre, Date Applied [1] | | | | | No. of Leaves Defoliated | | Pod Yield, Lbs./Acre |
|---|---|---|---|---|---|---|---|---|---|
| | | 7/12 | 7/22 | 7/27 | 8/1 | 8/11 | 9/11 | 10/12 | |
| Non-treated | | | | | | | 10.5 | 19.0 | 1,936 |
| Manganese ethylene bisdithiocarbonate | 30 | 0.80 | | 1.20 | | 1.20 | 8.1 | 15.8 | 2,216 |
| Do | 30 | 0.80 | 0.80 | | 1.20 | 1.20 | 7.2 | 14.1 | 2,410 |
| n-Dodecylguanidine acetate | 30 | 0.32 | | 0.48 | | 0.48 | 6.7 | 15.1 | 2,296 |
| Copper as in copper tallate | 30 | 0.16 | | 0.24 | | 0.24 | 7.2 | 10.1 | 2,602 |
| Copper as in tribasic copper sulfate plus sulfur (dust) [2] | | 0.95 | | 1.06 | | 1.06 | 7.4 | 15.9 | 2,329 |

[1] Recommended rates of active ingredients.
[2] Dust mixture containing 10% tribasic copper sulfate (53% copper) and 90% sulfur.

TABLE 4.—COMPARATIVE EFFECTIVENESS OF COPPER TALLATE AND OTHER FUNGICIDES IN CONTROLLING PEANUT LEAF SPOT (CAUSED BY *CERCOSPORA ARACHIDICOLA* HORI AND/OR *C. PERSONATA* BERK. AND CURT.) WHEN APPLIED WITH DDT AS INDICATED BY YIELD [1]

| Fungicide [2] | Lbs./Acre [3] | Cured Peanuts, Lbs./Acre |
|---|---|---|
| Copper as in copper tallate | 0.32 | 1,425 |
| Do | 0.48 | 1,606 |
| Do | 0.64 | 1,850 |
| Do | 0.80 | 1,604 |
| Manganese ethylene bisdithiocarbamate | 1.60 | 1,522 |
| Do | 1.06 | 1,544 |
| Copper as in tribasic copper sulfate plus sulfur | 1.00 | 1,531 |
| N-trichloromethyl thiophthalimide | 0.64 | 1,572 |
| n-Dodecylguanidine acetate | 1.92 | 1,562 |
| Do | | 1,460 |
| Non-treated (DDT only) | | |

[1] Insect control was comparable in all treatments including the non-treated checks.
[2] Each fungicide mixed and applied with 0.5 gallon DDT.
[3] Recommended rates of active ingredients.

Results similar to those shown above have been obtained in numerous tests when copper tallate in water at various gallonage rates per acre (10–40 gallons) was applied as a spray with conventional spray equipment in which agitation was not necessary. For most purposes 0.5 to 2.0 gallons of copper tallate (0.16–0.64 lb. of copper) per 10 to 40 gallons of spray emulsion will give best results. The optimum concentration in any given case will depend upon ambient environmental conditions present.

The data cited above (Tables 2, 3 and 4) and other similar tests show that excellent sprayability, coverage, adherence, and residual activity, and consequently excellent disease control, are obtained with copper tallate. Immediately after being sprayed, plants are well covered as indicated by a visible film of fungicide on the leaf surface. Residual fungicidal activity is manifested by the fact that the above data (Tables 2 and 3) show that copper tallate decreased defoliation and increased yield when applied at 14–15 day intervals. It is a well known fact, as shown in Table 3, that carbamate and other organic fungicides manifest little residual activity and must be applied at 7 to 10 day intervals for effective disease control. Also, copper or copper-sulfur dust must be re-applied if rain follows an application. Due to the superior adherence and residual activity of copper tallate, such precautions are not necessary.

The advantages of using copper tallate as a fungicide include:

(1) It readily forms a highly stable emulsion when added to water at concentrations between 1 and 20% copper tallate.

(2) The resulting emulsion does not require agitation in spray application equipment.

(3) When used in the field the user has to contend with only copper tallate and water, not wetting or suspending agents are needed.

(4) The emulsion is applied at low gallonage rates (10–40) per acre.

(5) It offers excellent coverage, adherence, residual activity and sprayability properties.

(6) It causes no discomfort or inconvenience to the spray operator.

(7) It can be used in conventional spray equipment which includes insecticidal sprayers.

(8) It is compatible with certain insecticidal chemicals and it can be applied with them in one application procedure.

(9) Because of its residual capacity it need not be used as often as certain other fungicides.

(10) It is superior to other known fungicides with which it has been compared as shown by the above data.

What is claimed is:

1. A fungicidal composition emulsifiable in water for application in spray form, said composition consisting essentially of 40–50 parts of a mixture of oil-soluble copper salts of fatty and rosin acids, 10–15 parts of a non-ionic emulsifier, and 35–40 parts of an agricultural spray oil in the form of a petroleum distillate having a distillation range of 600° F.–900° F. and SUS viscosity in the range of 70–160 at 100° F., said oil-soluble copper salts comprising 10–14% copper oleate, 8–12% copper linoleate and 20–25% copper abietate.

2. The composition of claim 1 in which said non-ionic emulsifier is of the alkylphenoxypoly(ethyleneoxy)ethanol group.

3. The composition of claim 1 in which the emulsifier is nonylphenoxypoly(ethyleneoxy)ethanol.

References Cited by the Examiner

UNITED STATES PATENTS

| 2,777,791 | 1/1957 | Visor | 167—16 |
| 2,947,659 | 8/1960 | Rogers | 167—16 |
| 2,997,421 | 8/1961 | Hosmer | 167—42 |
| 3,052,604 | 9/1962 | Davis | 167—42 |
| 3,055,802 | 9/1962 | Lyons | 167—42 |
| 3,077,433 | 2/1963 | Holysz | 167—42 |

OTHER REFERENCES

Frear, Chemistry of Insecticides, Fungicides and Herbicides, 2nd Ed., 1948, pages 189, 190, 223–226, 280–289.

De Org, E., Chemistry and Uses of Pesticides, Reinhold Publishing Corp., New York (1956), page 91.

JULIAN S. LEVITT, *Primary Examiner.*

S. J. FRIEDMAN, *Assistant Examiner.*